(12) United States Patent
Maclean et al.

(10) Patent No.: US 12,524,041 B2
(45) Date of Patent: Jan. 13, 2026

(54) DEVICE CONTACT SURFACES

(71) Applicant: Hewlett-Packard Development Company, L.P., Spring, TX (US)

(72) Inventors: Kenneth Maclean, Spring, TX (US); Chad Patrick Paris, Spring, TX (US); Woojin Chung, Spring, TX (US); Stacy L Wolff, Spring, TX (US); Eric Chen, Spring, TX (US); Oliver Poyntz, London (GB); Marcus Hoggarth, London (GB); Benjamin Carroll, London (GB)

(73) Assignee: Hewlett-Packard Development Company, Ltd., Spring, TX (US)

( * ) Notice: Subject to any disclaimer, the term of this patent is extended or adjusted under 35 U.S.C. 154(b) by 137 days.

(21) Appl. No.: 18/554,323

(22) PCT Filed: Apr. 20, 2021

(86) PCT No.: PCT/US2021/028186
§ 371 (c)(1),
(2) Date: Oct. 6, 2023

(87) PCT Pub. No.: WO2022/225514
PCT Pub. Date: Oct. 27, 2022

(65) Prior Publication Data
US 2024/0184331 A1     Jun. 6, 2024

(51) Int. Cl.
*G06F 1/16* (2006.01)
(52) U.S. Cl.
CPC .......... *G06F 1/1632* (2013.01); *G06F 1/1681* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,898,038 | B2* | 2/2018 | Tzou | G06F 1/1654 |
| 10,031,557 | B1* | 7/2018 | Morrison | G06F 1/189 |
| 10,649,548 | B2* | 5/2020 | Pirie | G06F 3/03545 |
| 10,990,204 | B1* | 4/2021 | Trim | G06F 1/1669 |
| 11,460,881 | B2* | 10/2022 | Sugiyama | G06F 1/1615 |
| 11,714,451 | B2* | 8/2023 | Lee | G06F 3/03545 361/679.01 |
| 2010/0050196 | A1 | 2/2010 | Christie, Jr. | |
| 2014/0049894 | A1* | 2/2014 | Rihn | G06F 1/1616 335/219 |
| 2015/0277500 | A1* | 10/2015 | Turowski | G06F 3/03545 361/679.56 |
| 2015/0305173 | A1* | 10/2015 | Hamada | G06F 1/1643 361/679.01 |
| 2016/0282909 | A1* | 9/2016 | Tzou | G06F 1/1654 |
| 2017/0153665 | A1* | 6/2017 | Tsai | G06F 1/1669 |
| 2018/0039343 | A1* | 2/2018 | Park | G06F 3/03545 |
| 2018/0181167 | A1* | 6/2018 | Lam | G06F 1/1616 |
| 2018/0335803 | A1 | 11/2018 | Jan et al. | |

(Continued)

*Primary Examiner* — Lisa Lea-Edmonds
(74) *Attorney, Agent, or Firm* — Quarles & Brady LLP (57) ABSTRACT

An example system includes a peripheral device including a first contact surface, and an electronic device including a housing, a second contact surface aligned with a surface of the housing, and a hinge coupled to the second contact surface. The second contact surface is to pivot into the housing about the hinge in response to an engagement with the first contact surface of the peripheral device.

20 Claims, 9 Drawing Sheets

(56) References Cited

U.S. PATENT DOCUMENTS

| | | | |
|---|---|---|---|
| 2022/0137664 A1* | 5/2022 | Sugiyama | G06F 1/1607 |
| | | | 361/679.27 |
| 2023/0131751 A1* | 4/2023 | Kim | H04M 1/0216 |
| | | | 361/679.01 |
| 2024/0184331 A1* | 6/2024 | Maclean | G06F 1/1656 |

* cited by examiner

DEVICE CONTACT SURFACES

BACKGROUND

A peripheral device may be utilized to make inputs on an electronic device. The peripheral device may include a separate, independent body from that of the electronic device. Thus, during operations, the peripheral device may be maneuvered, transported, stored independently and separately from the electronic device.

BRIEF DESCRIPTION OF THE DRAWINGS

Various examples will be described below referring to the following figures.

DETAILED DESCRIPTION

A peripheral device may comprise a separate, independent body from a corresponding electronic device. As a result, a user may misplace a peripheral device. In some instances, the peripheral device may be connected to the electronic device when the peripheral device is not in use. However, the attachment mechanisms used to secure the peripheral device to the electronic device may be prone to disconnection when subjected to shear forces (e.g., such as forces directed along the connected, outer surfaces of the peripheral device and electronic device).

Accordingly, the examples disclosed herein include attachment mechanisms for attaching a peripheral device to a corresponding electronic device that may resist shear forces. In some examples, the attachment mechanisms disclosed herein may include contact surfaces that rotate when connecting a peripheral device to the electronic device to angle the plane of contact therebetween relative to the direction of shear force application. In addition, in some examples the engaged, rotated contact surfaces of the attachment mechanisms disclosed herein may be recessed (e.g., partially) within an outer surface of the electronic device (or peripheral device) to further prevent disconnection due to shear forces. Therefore, through use of the example attachment mechanisms disclosed herein, a peripheral device may be more securely held to an electronic device such that instance of a misplaced peripheral device may be reduced.

Figure 1:
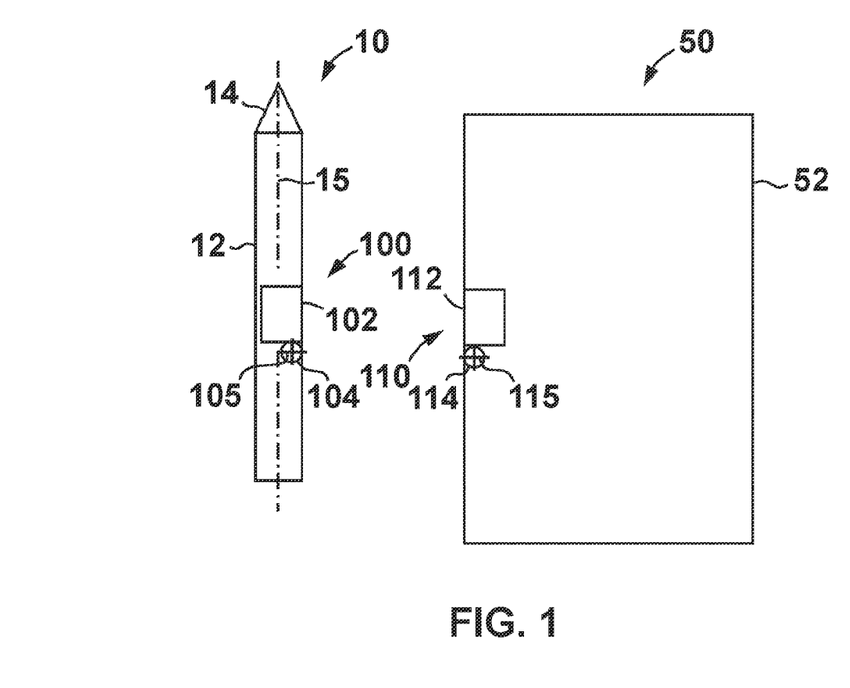
FIGS. 1 and 2 are schematic views of a peripheral device and electronic device including attachment mechanisms according to some examples.
Figure 2:
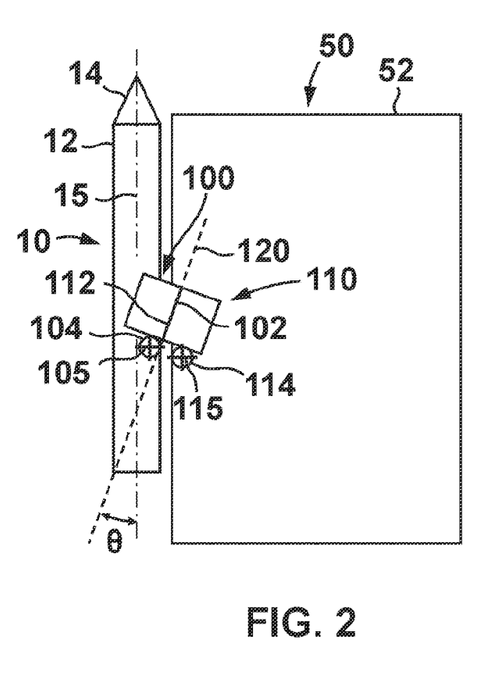

Referring now to FIGS. 1 and 2, a peripheral device 10 and electronic device 50 including attachment mechanisms 100, 110, respectively, according to some examples are shown. The electronic device 50 may comprise any device that may execute machine-readable instructions. For instance, in some examples, the electronic device 50 may comprise a laptop computer, tablet computer, smart phone, all-in-one computer, desktop computer, etc.

Peripheral device 10 may comprise any device that may be utilized to make inputs and/or receive outputs from electronic device 50. For instance, in some examples, a peripheral device 10 may comprise a stylus, a mouse, a mobile document scanner, etc. In the case of FIGS. 1 and 2, peripheral device 10 comprises a stylus. In particular, peripheral device 10 includes a body 12 having a central or longitudinal axis 15. The body 12 is generally cylindrical in shape and includes a conical tip 14 positioned at one end. During operations, a user may grasp body 12 and may make inputs on electronic device 50 by engaging tip 14 with a touch sensitive surface (e.g., a touch sensitive display on electronic device 50).

Electronic device 50 includes a housing 52 that is to contain various other components (e.g., processor(s), memory(ies), displays). Peripheral device 10 includes a first attachment mechanism 100 coupled to body 12 that includes a first contact surface 102, and electronic device 50 includes a second attachment mechanism 110 coupled to housing 52 that includes a second contact surface 112. The first contact surface 102 may be coupled to a hinge 104 positioned within and/or on body 12 that has an axis of rotation 105 extending in a direction that is generally perpendicular to the direction of axis 15. Similarly, second contact surface 112 may be coupled to a hinge 114 positioned within and/or on housing 52 that has an axis of rotation 115. Thus, during operations, the first contact surface 102 may pivot about axis of rotation 105 relative to body 12, and second contact surface 112 may pivot about axis 115 relative to housing 52.

In particular, as best shown in FIG. 1, when the peripheral device 10 is separated from electronic device 50, the first contact surface 102 may be rotated about axis of rotation 105 via hinge 104 so that first contact surface 102 is aligned (e.g., flush, co-planar) with the other outer surfaces of body 12 that are adjacent to (or that surround) the first attachment mechanism 100. Similarly, when the peripheral device 10 and electronic device 50 are separated as shown in FIG. 1, the second contact surface 112 is rotated about axis 115 via hinge 114 so that second contact surface 112 is aligned (e.g., flush, co-planar) with the outer surfaces of housing 52 that are adjacent to (or that surround) second attachment mechanism 110. The positions of the first contact surface 102 and the second contact surface 112 shown in FIG. 1 may be referred to herein as a "retracted position" of the first attachment mechanism 100 (or first contact surface 102) and the second attachment mechanism 110 (or second contact surface 112).

Conversely, as best shown in FIG. 2, when the peripheral device 10 is attached to electronic device 50 so that attachment mechanisms 100, 110 are engaged with one another, the contact surfaces 102, 112 may engage with one another and rotate about the axes 105, 115 via hinges 104, 114, respectively. In particular, the first contact surface 102 may rotate about axis of rotation 105 via hinge 104 so as to project away from body 12, and second contact surface 112 may rotate about axis 115 via hinge 114 so as to recess into housing 52. As described in more detail below, the contact surfaces 102, 112 may engage with one another and rotate about axes 105, 115 in due a magnetic attraction between magnets (not shown) coupled to the attachment mechanisms 100, 110.

As shown in FIG. 2, when the contact surfaces 102, 112 are rotated about axes 105, 115, respectively, and engaged with one another, the plane of engagement 120 between the contact surfaces 102, 112 may extend at an angle θ with the central axis 15 of peripheral device 10. In some examples, the angle θ may be greater than 0° and less than 90°. For instance, in some examples the angle θ may range from about 1° to about 10°. In addition, a portion of the engaged contact surfaces 102, 112 may be inserted (or recessed) within the housing 52 of electronic device 50. As a result, shear forces that are directed along or parallel to the central axis 15 of peripheral device 10 may be resisted by the engagement of the angled contact surface 102, 112, and the instances of an accidental disconnection of peripheral device 10 may be reduced.

Figure 3:
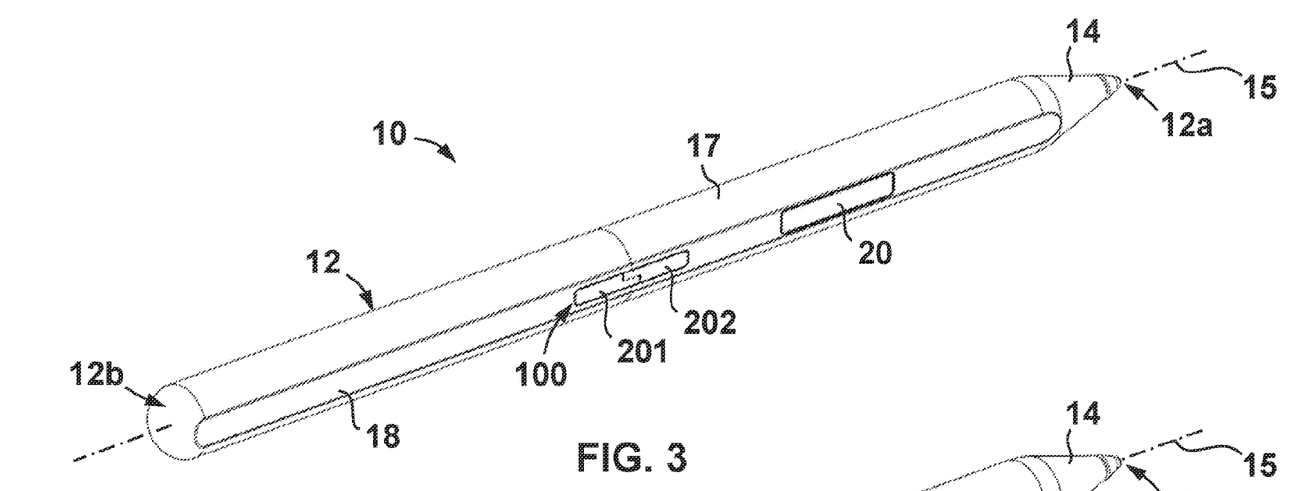
FIGS. 3 and 4 are perspective views of a peripheral device including an attachment mechanism in a retracted and deployed position, respectively, according to some examples.
Figure 4:
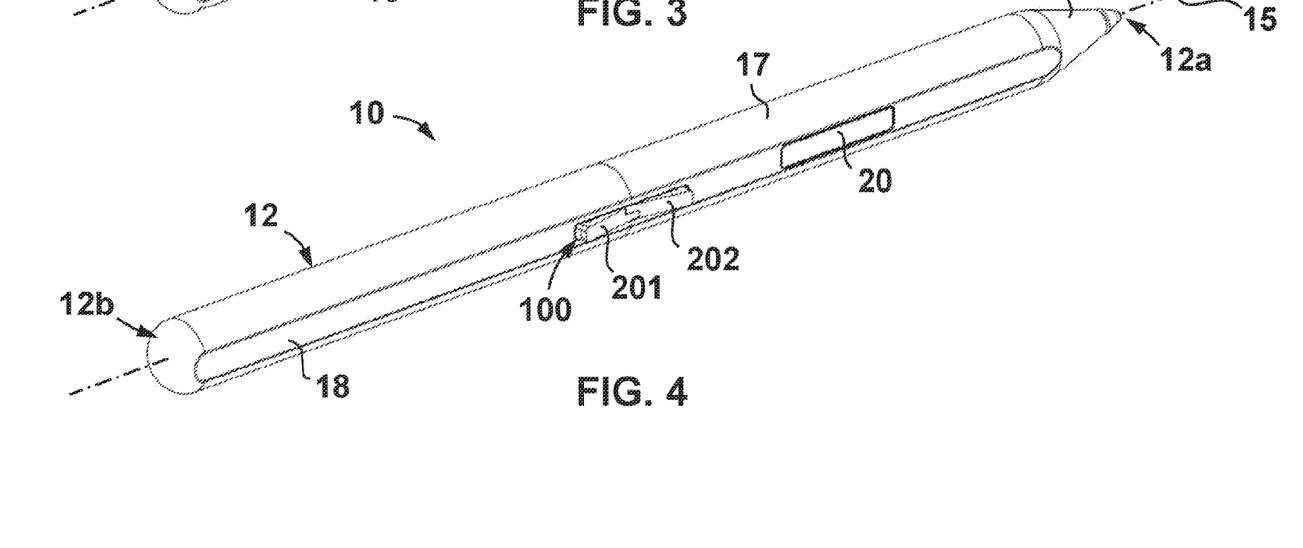

Referring now to FIGS. 3 and 4, in some examples, body 12 of peripheral device 10 may include a first end 12a, and a second end 12b opposite first end 12a along axis 15. The tip 14 is positioned at the first end 12a and is generally conical in shape. In addition, body 12 includes a cylindrical surface 17, and a planar surface (which may be referred to herein as a facet) 18 both extending axially between ends 12a, 12b. The cylindrical surface 17 may extend circumferentially from either circumferential side of planar surface 18.

First attachment mechanism 100 is positioned on planar surface 18, and is spaced axially between ends 12a, 12b. In addition, an input device (e.g., such as a button or touch sensitive surface) 20 is positioned on planar surface 18, axially between first attachment mechanism 100 and tip 14. In some examples, the first attachment mechanism 100 comprises a pair of planar contact surfaces 201, 202 (either of which may comprise the contact surface 102 shown in FIGS. 1 and 2) that are rotatable about a common axis of rotation (e.g., axis of rotation 105 shown in FIGS. 1 and 2). Thus, as shown in the progression from FIG. 3 to FIG. 4, during operations, the contact surfaces 201, 202 may rotate in opposite directions about the common axis (e.g., axis of rotation 105 in FIGS. 1 and 2) to project outward or away from axis 15 and planar surface 18 to engage with corresponding contact surfaces (e.g., contact surface 112 in FIGS. 1 and 2) on an electronic device 50.

Figure 5:
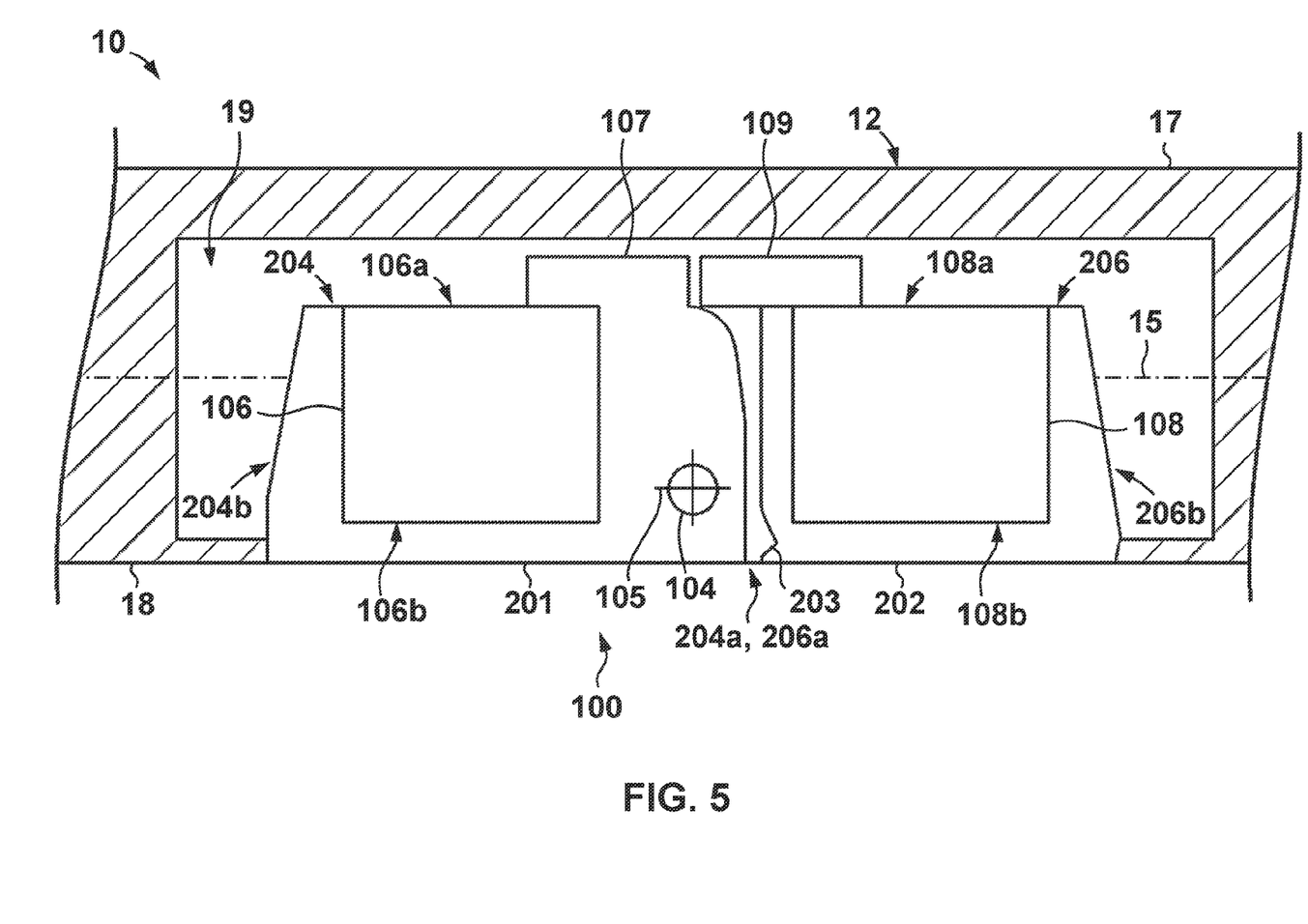
FIG. 5 is a side cross-sectional view of the attachment mechanism of the peripheral device of FIGS. 1 and 2 according to some examples.

Referring now to FIG. 5, in some examples, first attachment mechanism 100 may be received within a cavity 19 defined within body 12 of peripheral device 10. The first and second contact surfaces 201, 202 are defined on a pair of rotating members 204, 206 (which may be referred to herein as a first rotating member 204 and a second rotating member 206), respectively that are positioned within cavity 19. The rotating members 204, 206 include first or inner ends 204a, 206a, respectively, and second or outer ends 204b, 206b, respectively. The inner ends 204a, 206a may be proximate to axis of rotation 105 while the outer ends 204b, 206b may be distal to axis of rotation 105 (e.g., the inner ends 204a, 206a may be closer to axis of rotation 105 than outer ends 204b, 206b, respectively).

The rotating members 204, 206 are stacked atop one another at inner ends 204a, 206a, and hinge 104 (which may comprise a pin in some examples) extends through the rotating members 204, 206 along axis of rotation 105. The hinge 104 may also be secured to body 12 (e.g., hinge 104 may be secured or molded to an inner surface of cavity 19) so that hinge 104 both supports rotating members 204, 206 within cavity 19 and facilitates the rotation of rotating members 204, 206 about axis of rotation 105 during operations. Second rotating member 206 includes a recess 203 proximate to inner end 206a.

Each rotating member 204, 206 includes a magnet 106, 108, respectively, coupled thereto. The magnets 106, 108 may be referred to herein as a first magnet 106 and a second magnet 108. The magnets 106, 108 may comprise permanent magnets or electromagnets. In addition, in some examples, the magnets 106, 108 are coupled to (e.g., embedded within) rotating members 204, 206, respectively, such that when rotating members 204, 206 (or contact surfaces 201, 202, respectively) rotate about axis of rotation 105, the magnets 106, 108 also rotate about axis of rotation 105. Each magnet 106, 108 includes a first magnetic pole (or more simply a "first pole") 106a, 108a, and a second magnetic pole (or more simply a "second pole") 106b, 108b opposite first pole 106a, 108a.

The first magnet 106 is coupled to the first rotating member 204 such that the first pole 106a faces away from first contact surface 201, and second pole 106b faces toward first contact surface 201 (thus, the second pole 106b is more proximate the first contact surface 201 than the first pole 106a). Similarly, the second magnet 108 is coupled to the second rotating member 206 such that the first pole 108a faces away from second contact surface 202, and second pole 108b faces toward second contact surface 202 (thus, the second pole 108b is more proximate the second contact surface 202 than the first pole 108a).

The first poles 106a, 108a of magnets 106, 108, respectively, may have opposite polarities from one another (e.g., North to South, or South to North). As a result, when peripheral device 10 is separated from electronic device 50 (FIG. 1), a magnetic attraction between the first poles 106a, 108a of magnets 106, 108 may cause rotating members 204, 206 to rotate the outer ends 204b, 206b in toward cavity 19 about axis of rotation 105 via hinge 104, so as to place the first attachment mechanism 100 in a retracted position as previously described. In the view of FIG. 5, the magnetic attraction between first poles 106a, 108a of magnets 106, 108 may rotate first rotating member 204 in a clockwise direction about axis of rotation 105, and may rotate second rotating member 206 in a counter-clockwise direction about axis of rotation 105. The rotation of rotating members 204, 206 via the magnetic attraction between first poles 106a, 108a to the retracted position of FIG. 5 may place the contact surfaces 201, 202 into alignment with planar surface 18 of body 12. For instance, in the retracted position of FIG. 5, the contact surfaces 201, 202 may be co-planar, or flush with the planar surface 18, and may extend parallel to axis 15. In addition, once the first attachment mechanism 100 has reached the retracted position of FIG. 5, further rotation of the rotating members 204, 206 via the magnetic attraction between first poles 106a, 108a is prevented via contact between stops 107, 109 formed on rotating members 204, 206, respectively. The stops 107, 109 may be formed on a side that is opposite the contact surfaces 201, 202, respectively, on rotating members 204, 206, respectively.

Figure 6:
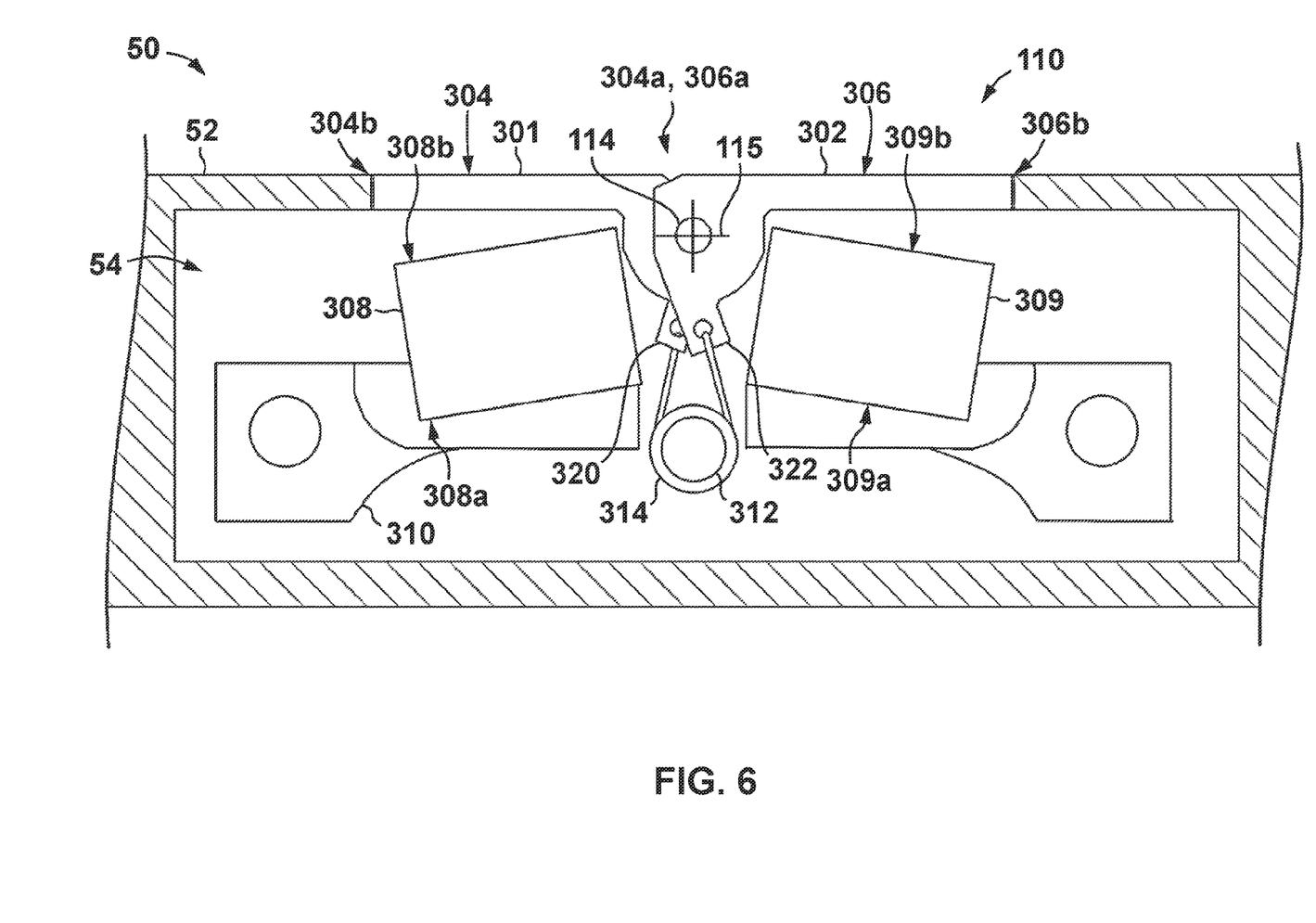
FIG. 6 is a partially side cross-sectional view of the attachment mechanism of the electronic device of FIGS. 1 and 2 according to some examples.

Referring now to FIG. 6, an example of second attachment mechanism 110 that may engage with first attachment mechanism 100 depicted in FIG. 5 is shown. In some examples, second attachment mechanism 110 may be received within a cavity 54 defined within housing 52 of electronic device 50. In addition, in some examples, the second attachment mechanism 110 may include a pair of planar contact surfaces 301, 302 (either of which may comprise the contact surface 112 shown in FIGS. 1 and 2) that are rotatable about the common axis of rotation 115. The first and second contact surfaces 301, 302 are defined on a pair of rotating members 304, 306, respectively that are positioned within cavity 54. The rotating members 304, 306 include first or inner ends 304a, 306a, respectively, and second or outer ends 304b, 306b, respectively. The inner ends 304a, 306a may be proximate to axis 115 while the outer ends 304b, 306b may be distal to axis 115 (e.g., the inner ends 304a, 306a may be closer to axis 115 than outer ends 304b, 306b, respectively).

The rotating members 304, 306 are stacked atop one another at inner ends 304a, 306a, and hinge 114 (which may comprise a pin in some examples) extends through the rotating members 304, 306 along axis 115. The hinge 114 may also be secured to housing 52 (e.g., hinge 114 may be secured or molded to an inner surface of cavity 54) so that hinge 114 both supports rotating members 304, 306 within cavity 54 and facilitates the rotation of rotating members 304, 306 about axis 115 during operations.

Second attachment mechanism 110 also includes a pair of magnets 308, 309 positioned within cavity 54. In particular, the magnets 308, 309 are fixed within cavity 54 via a support bracket 310, such that magnet 308 is aligned with first rotating member 304, and magnet 309 is aligned with second rotating member 306. During operations, the rotating members 304, 306 (and contact surfaces 301, 302) may rotate about axis 115 relative to the magnets 308, 309 (which are fixed within cavity 54 as previously described). The magnets 308, 309 may comprise permanent magnets or electromagnets. Each magnet 308, 309 includes a first magnetic pole (or more simply a "first pole") 308a, 309a, and a second magnetic pole (or more simply a "second pole") 308b, 309b opposite first pole 308a, 309a.

The magnet 308 is positioned within cavity 54 such that the first pole 308a faces away from first contact surface 301, and second pole 308b faces toward first contact surface 301 (thus, the second pole 308b is more proximate the first contact surface 301 than the first pole 308a). Similarly, the magnet 309 is positioned within cavity 54 such that the first pole 309a faces away from second contact surface 302, and second pole 309b faces toward second contact surface 302 (thus, the second pole 309b is more proximate the second contact surface 302 than the first pole 309a). In addition, the first poles 308a, 309a of magnets 308, 309 may have opposite polarities from one another (e.g., North to South, or South to North), and the second poles 308b, 309b may have opposite polarities from one another (e.g., North to South, or South to North).

In some examples, the contact surfaces 301, 302 are made of a nonmagnetic material. For instance, in some examples, contact surfaces 301, 302 may comprise a polymer. As a result, the contact surfaces 301, 302 are unaffected by the magnetic fields associated with magnets 308, 309.

A biasing member 314 is mounted within cavity 54 via a post 312. In some examples, biasing member 314 comprises a torsional spring that is coupled to a pair of projections 320, 322 of rotating members 304, 306, respectively. During operations, biasing member 314 rotationally biases rotating members 304, 306 about axis 115 such that outer ends 304b, 306b are rotated outward from cavity 54 about axis 115 to achieve a retracted position shown in FIG. 6. When the rotating members 304, 306 are in the retracted position of FIG. 6, the contact surfaces 301, 302 are aligned (e.g., flush, co-planar) with the outer surface of housing 52 (e.g., in a region proximate to second attachment mechanism 110).

Thus, biasing member 314 biases the contact surfaces 301, 302 away from magnets 308, 309 in the retracted position of FIG. 6.

Figure 7:
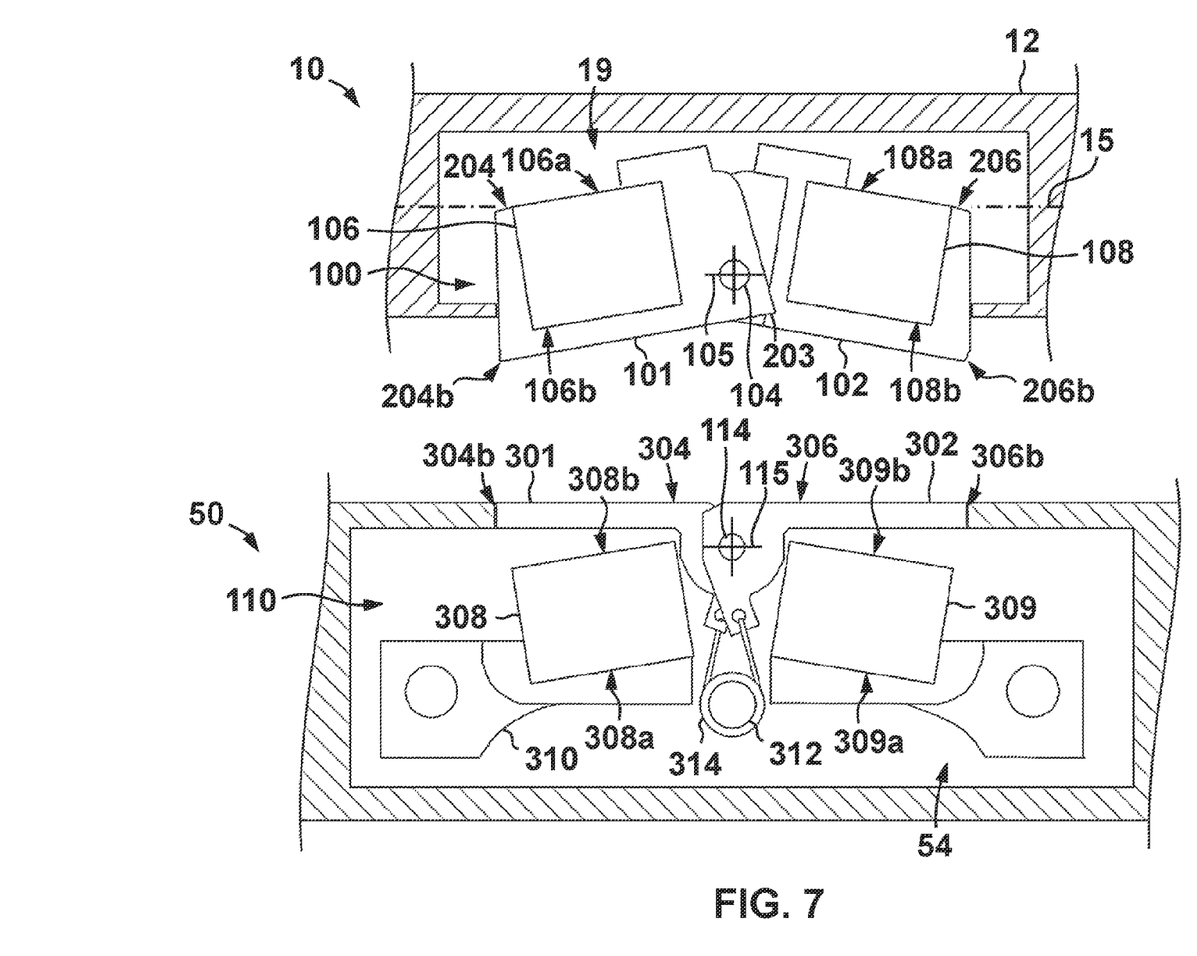
FIGS. 7 and 8 are side cross-sectional views of the attachment mechanisms of the peripheral device and electronic device of FIGS. 5 and 6 being coupled to one another according to some examples.

Referring now to FIG. 7, during operations when first attachment mechanism 100 on peripheral device 10 is brought within a proximity to second attachment mechanism 110 on electronic device 50, a magnetic attraction between the magnets 106, 108 of first attachment mechanism 100 and the magnets 308, 309 of second attachment mechanism 110 may cause the rotating members 204, 206 of first attachment mechanism 100 to rotate about axis of rotation 105 via hinge 104 from the retracted position (FIG. 5) to a deployed position. In particular, the second pole 106b of magnet 106 may have an opposite polarity from the second pole 308b of magnet 308, and the second pole 108b of magnet 108 may have an opposite polarity from second pole 309b of magnet 309. Thus, when attachment mechanisms 100, 110 are bought within the proximity to one another, the magnet 106 is attracted to the magnet 308 and the magnet 108 is attracted to the magnet 309. As a result, the magnets 106, 108 and rotating members 204, 206, respectively, rotate about axis of rotation 105, via hinge 104 so that outer ends 204b, 206b are rotated outward and extended away from body 12 in opposite direction about axis of rotation 105. Specifically, for the view depicted in FIG. 7, the outer end 204b of first rotating member 204 rotates outward from body 12 in a counter-clockwise direction and the outer end 206b of second rotating member 206 rotates outward from body 12 in a clockwise direction. The outward rotation of outer ends 204b, 206b may be limited via engagement of inner end 204a of first rotating member 204 within recess 203 formed on second rotating member 206.

As previously described, the contact surfaces 301, 302 of second attachment mechanism 110 are nonmagnetic. Thus, when attachment mechanisms 100, 110 are brought within a proximity to one another, and the contact surfaces 101, 102 are rotated outward and extended away from body 12 about axis of rotation 105 as previously described, the contact surfaces 301, 302 (and rotating members 304, 306, respectively) remain in the retracted position (e.g., of FIG. 6).

Figure 8:
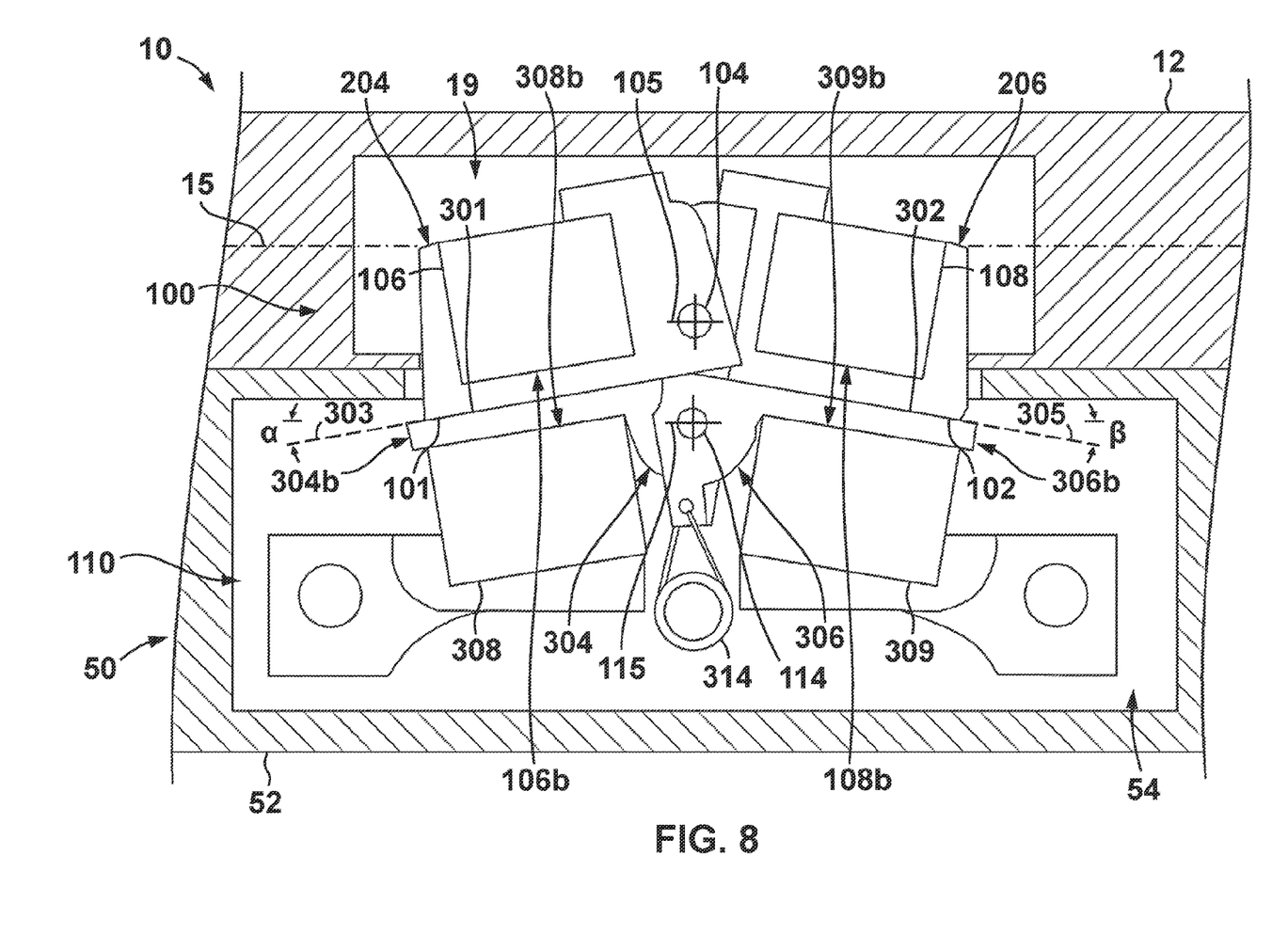

Referring now to FIG. 8, after the contact surfaces 101, 102 are rotated to the deployed position, the contact surfaces 101, 102 on first attachment mechanism 100 on peripheral device 10 may be engaged with contact surfaces 301, 302 on second attachment mechanism 110. The magnetic attraction between second poles 106b, 308b of magnets 106, 308 may then cause the contact surfaces 301, 302 to rotate about axis 115, against the bias provided by biasing member 314 until the contact surfaces 101, 301 are compressed between magnets 106, 308, and the contact surfaces 102, 302 are compressed between magnets 108, 309.

In particular, because the contact surfaces 101, 102 are rotated outward and extended away from body 12 in opposite directions about axis of rotation 105 as previously described, the engagement between contact surfaces 101, 102 with contact surfaces 301, 302 may rotate the outer ends 304b, 306b into cavity 54 about axis 115 in opposite directions. In the view of FIG. 8, the outer end 304b of first rotating member 304 may be rotated in a counter-clockwise direction about axis 115 into the cavity 54, and the outer end 306b of second rotating member 306 may be rotated in a clockwise direction about axis 115 into cavity 54.

Accordingly, when the attachment mechanisms 100, 110 are fully engaged as shown in FIG. 8, a portion of the engaged contact surfaces 101, 301 and the engage contact surfaces 102, 302 are positioned within the cavity 54. Also, a plane of contact 303 for the engaged contact surfaces 101, 301 may extend at an angle α relative to central axis 15, and a plane of contact 305 for the engaged contact surfaces 102, 302 may extend at an angle β relative to the central axis 15. In some examples, the angles α, β may be greater than 0° and less than 90°. For instance, in some examples the angles α, β may range from about 1° to about 10°. The planes of contact 303, 305 may converge (or diverge) to (or from) one another as generally shown in FIG. 8. Thus, if a shear force is applied to peripheral device 10 and/or electronic device 50 along (or parallel to) central axis 15, the angled orientation of the engaged contact surfaces 101, 301 and 102, 302 as well as the recessed position of the contact surfaces 101, 301 and 102, 302 within cavity 54 may resist disconnection.

Referring now to FIGS. 6-8, the magnetic attraction between second poles 106b, 308b of magnets 106, 308, respectively, and the magnetic attraction between second poles 108b, 309b of magnets 108, 309, respectively, may maintain the engagement between attachment mechanisms 100, 110 of peripheral device 10 and electronic device 50 shown in FIG. 8. However, if a user wishes to use the peripheral device 10 (e.g., to make inputs on electronic device 50), a sufficient force may be applied (e.g., by pulling) on the body 12 of peripheral device 10 in a direction that is perpendicular to axis 15 to overcome the magnetic attraction between magnets 106, 108, 308, 309 and thereby disconnect contact surfaces 101, 102, 301, 302. Upon disconnection of contact surface 101, 102, 301, 302, the rotating members 304, 306 may rotate about axis 115 back to the retracted position of FIG. 7 under the force of biasing member 314. In addition, once the first attachment mechanism 100 of peripheral device 10 has been moved to a sufficient distance from second attachment mechanism 110 of electronic device 50, the rotating members 204, 206 may rotate about axis of rotation 105 via the magnetic attraction between poles 106a, 108a of magnets 106, 108 back to the retracted position of FIG. 5.

Figure 9:
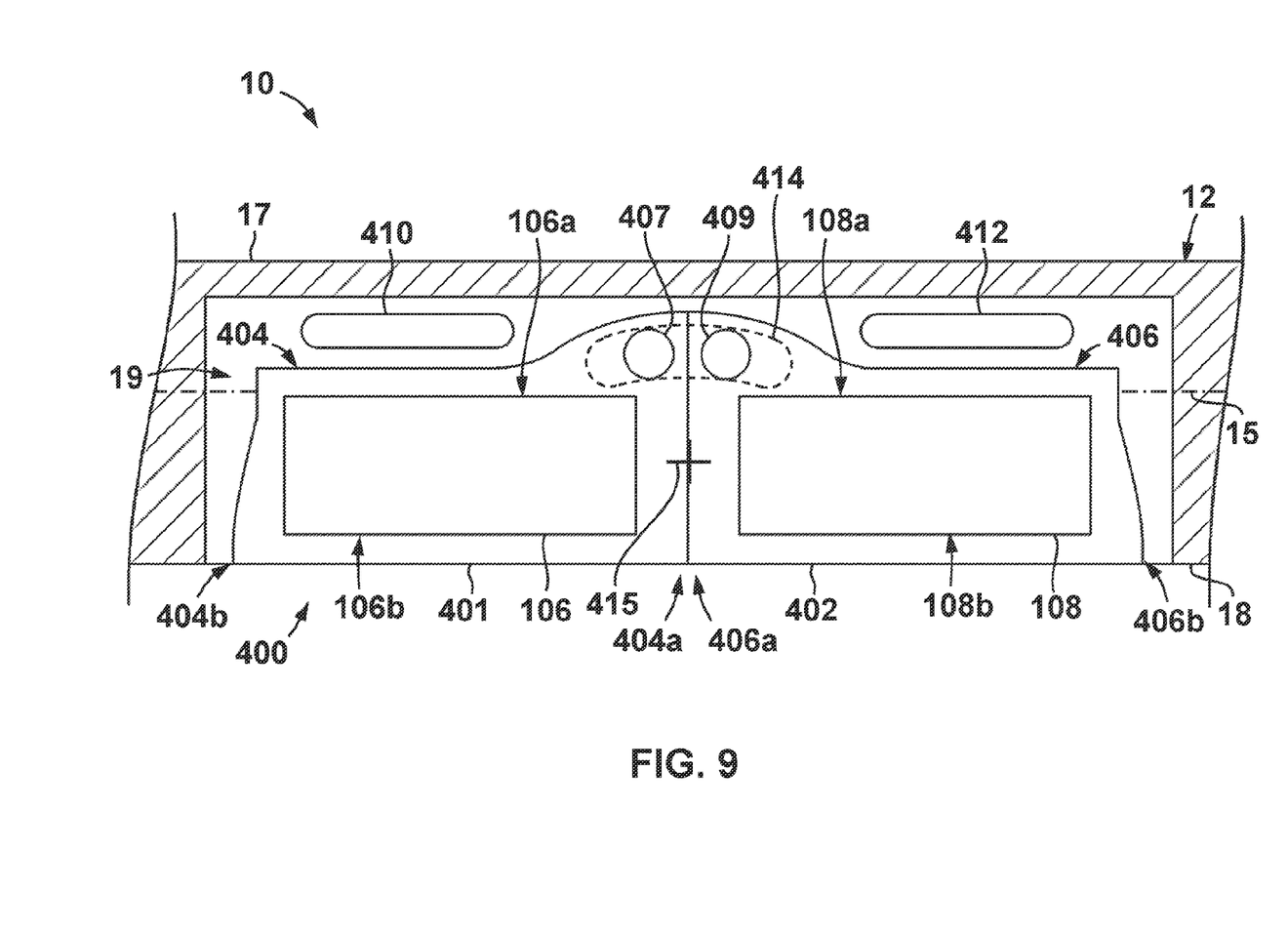
FIG. 9 is a side cross-sectional view of an attachment mechanism of the peripheral device of FIGS. 1 and 2 according to some examples.

Referring now to FIG. 9, an example of first attachment mechanism 400 that may be utilized as the first attachment mechanism 100 of FIG. 1 is shown. In describing the features of first attachment mechanism 400, the same reference numerals will be used to designate features that are also included on the example of first attachment mechanism 100 of FIGS. 5, 7, and 8. The first attachment mechanism 400 is positioned within cavity 19 of body 12 of peripheral device 10.

First attachment mechanism 400 includes a first planar contact surface 401 defined on a first rotating member 404, and a second planar contact surface 402 defined on a second rotating member 406. The rotating members 404, 406 include first or inner ends 404a, 406a, respectively, and second or outer ends 404b, 406b, respectively. The inner ends 404a, 406a may be proximate to an axis of curvature 415 while the outer ends 404b, 406b may be distal to axis of curvature 415 (e.g., the inner ends 404a, 406a may be closer to axis of curvature 415 than outer ends 404b, 406b, respectively). The inner ends 404a, 406a are positioned immediately axially adjacent one another along axis 15 of peripheral device 10.

In addition, rotating members 404, 406 include pins 407, 409, respectively, that are engaged within a slot 414 that is defined within cavity 19. The slot 414 may be curved about an axis of curvature 415 that extends in a direction that is perpendicular to a direction of axis 15 of peripheral device 10. During operations, the rotating members 404, 406 may rotate about axis of curvature 415 via movement of the pins 407, 409, respectively, within and along slot 414. Together, the slot 414 and pins 407 may be referred to as a "hinge," of first attachment mechanism 400.

The magnets 106, 108 are coupled to (e.g., embedded within) the rotating members 404, 406, respectively, such that the second poles 106b, 108b face toward contact surfaces 401, 402, respectively, and first poles 106a, 108a, respectively, face away from contact surfaces 401, 402, respectively. In addition, a pair of magnetic members 410, 412 are positioned within cavity 19 such that first pole 106a of first magnet 106 is magnetically attracted to first magnetic member 410, and first pole 108a of second magnet 108 is magnetically attracted to second magnetic member 412. The magnetic members 410, 412 may comprise a ferromagnetic material, such as a metal (e.g., iron).

The magnetic attraction between magnetic members 410, 412 and first poles 106a, 108a of magnets 106, 108, respectively, causes rotating members 404, 406 to rotate in opposite directions about axis of curvature 415 such that outer ends 404b, 406b are rotated inward, toward cavity 19, and contact surfaces 401, 402 are aligned with (e.g., flush, co-planar) planar surface 18 of body 12 (FIGS. 2 and 3). This position, which is depicted in FIG. 9, may be referred to as a "retracted" position of first attachment mechanism 400.

Figure 10:
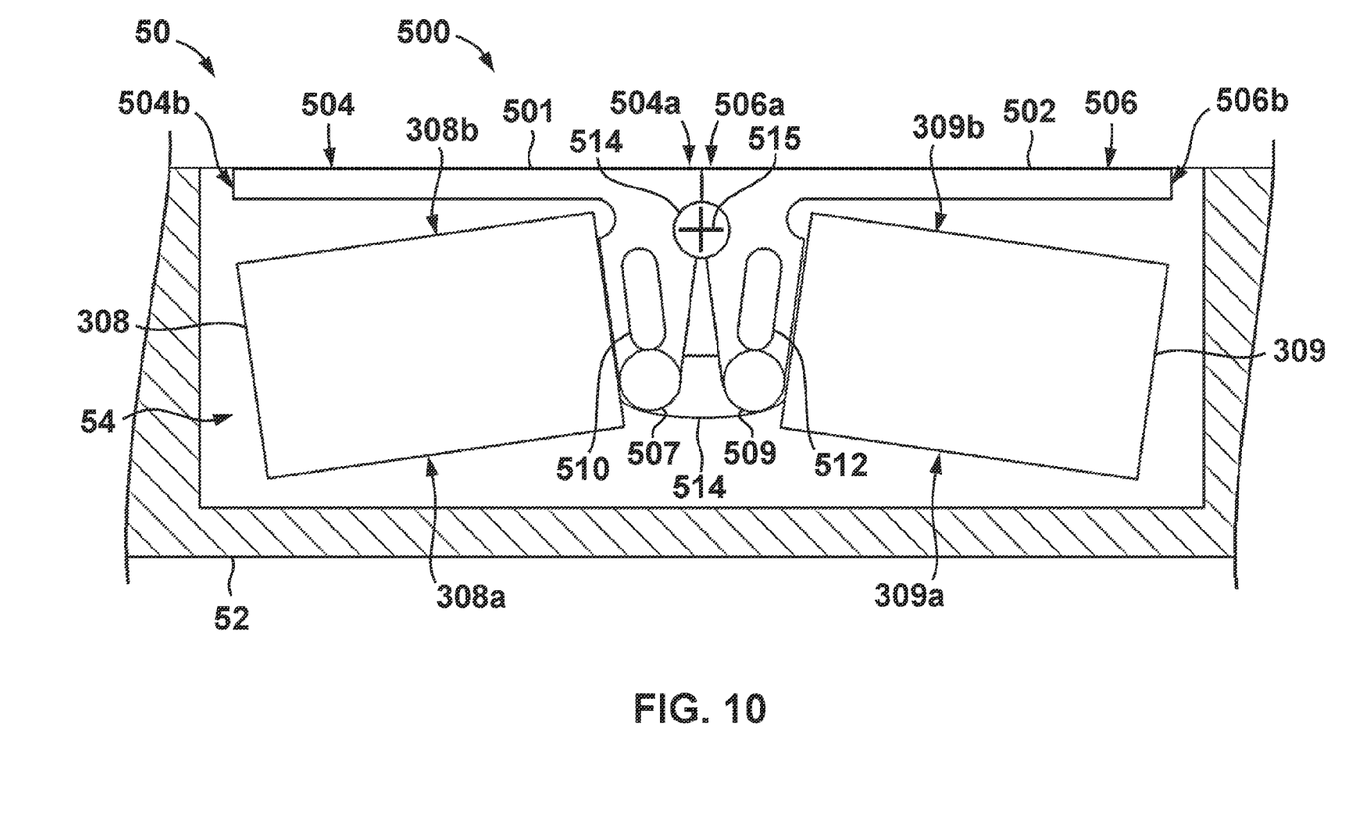
FIG. 10 is a side cross-sectional view of an attachment mechanism of the electronic device of FIGS. 1 and 2 according to some examples.

Referring now to FIG. 10, an example of second attachment mechanism 500 that may be utilized as the second attachment mechanism 110 of FIG. 1 is shown. In describing the features of second attachment mechanism 500, the same reference numerals will be used to designate features that are also included on second attachment mechanism 110 of FIGS. 6, 7, and 8. The second attachment mechanism 500 is positioned within cavity 54 of housing 52 of electronic device 50.

Second attachment mechanism 500 includes a first planar contact surface 501 defined on a first rotating member 504, and a second planar contact surface 502 defined on a second rotating member 506. The rotating members 504, 506 include first or inner ends 504a, 506a, respectively, and second or outer ends 504b, 506b, respectively. The inner ends 504a, 506a may be proximate to axis of rotation 515 while the outer ends 504b, 506b may be distal to axis of rotation 515 (e.g., the inner ends 504a, 506a may be closer to axis of rotation 515 than outer ends 504b, 506b, respectively). The inner ends 504a, 506a are positioned immediately adjacent one another.

Rotating members 504, 506 are pivotably coupled to a hinge 516 (e.g., which may comprise a pin defined within cavity 54) about an axis of rotation 515. In addition, rotating members 504, 506 include pins 507, 509, respectively, that are slidingly engaged within a slot 514 that is defined within cavity 54. The slot 514 may be curved about axis of rotation 515. During operations, the rotating members 504, 506 may rotate about axis of rotation 515 via rotation about hinge 516 and slidingly engagement of the pins 507, 509, respectively, within and along slot 514. Together, the slot 514 and pins 507, 509 may be referred to as a "hinge," of second attachment mechanism 500.

The magnets 308, 309 are fixed within cavity 54 (e.g., via support bracket 310 shown in FIG. 6) such that second poles 308b, 309b face toward contact surfaces 501, 502, respectively, and first poles 308a, 309a face away from contact surfaces 501, 502, respectively. Also, during operations, the rotating members 504, 506 (and contact surfaces 501, 502) may rotate about axis of rotation 515 relative to magnets 308, 309 (which are fixed within cavity 54 as previously described). In addition, magnetic members 510, 512 are coupled to (e.g., embedded within) rotating members 504, 506, respectively, proximate pins 507, 509, respectively. The magnetic member 510 coupled to first rotating member 504 may be magnetically attracted to magnet 308 (e.g., such as to the first pole 308a or second pole 308b), and the magnetic member 512 coupled to second rotating member 506 may be magnetically attracted to magnet 309 (e.g., such as to first pole 309a or second pole 309b). The magnetic members 510, 512 may comprise a ferromagnetic material, such as a metal (e.g., iron). Thus, the magnetic attraction between the magnetic members 510, 512 may bias the contact surfaces 501, 502 away from magnets 308, 309 in the retracted position of FIG. 10.

The magnetic attraction between magnetic members 510, 512 and magnets 308, 309, respectively, causes rotating members 504, 506 to rotate in opposite directions about axis of rotation 515 such that outer ends 504b, 506b are rotated outward from cavity 54, until rotating members 504, 506 contact magnets 308, 309, respectively, and contact surfaces 501, 502 are aligned with (e.g., flush, co-planar) the outer surface(s) of housing 52. This position, which is depicted in FIG. 10, may be referred to as a "retracted" position of second attachment mechanism 500. Other than magnetic members 510, 512, the rotating members 504, 506 (and particularly contact surfaces 501, 502) are nonmagnetic.

Figure 11:
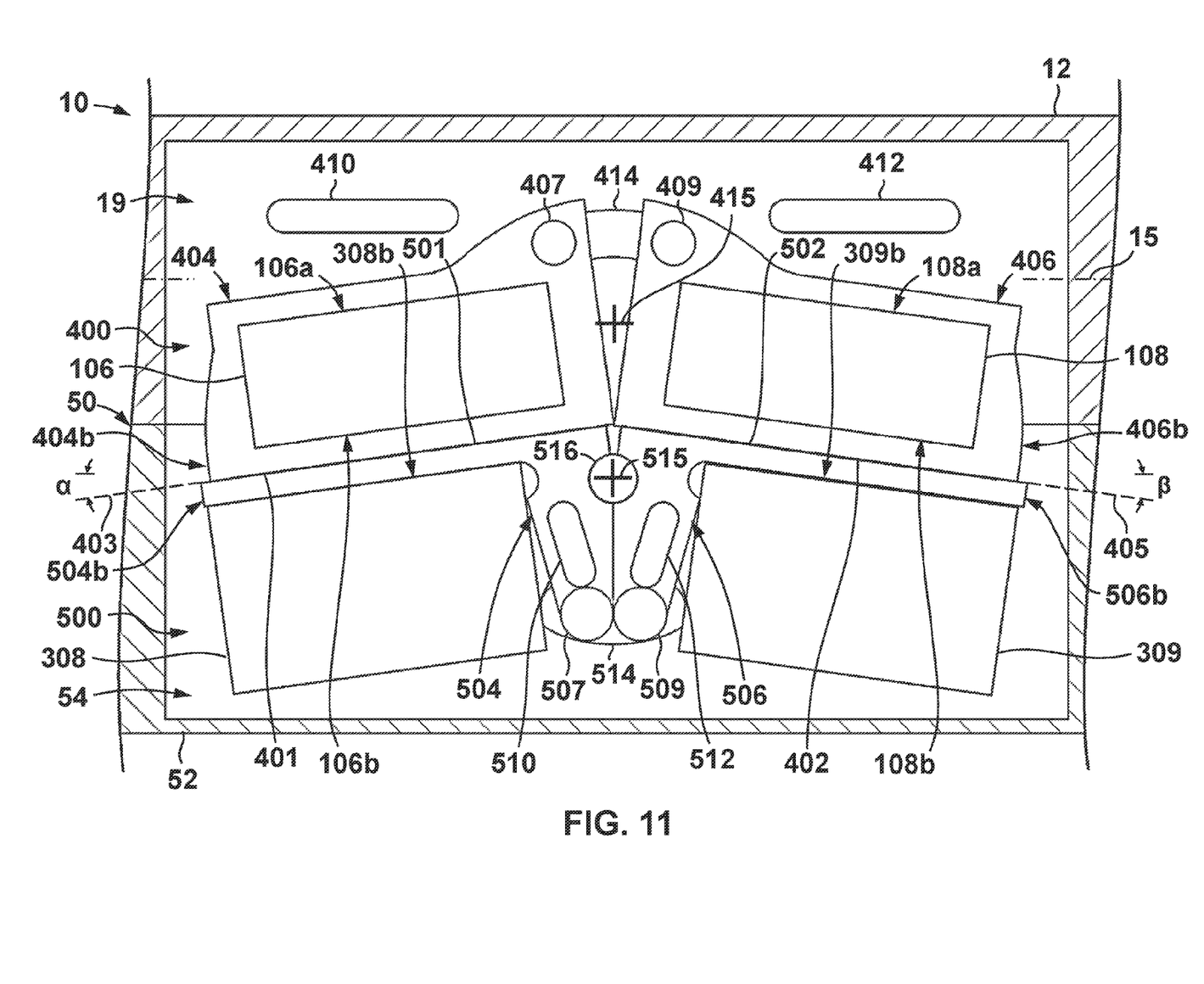
FIG. 11 is a side cross-sectional view of the attachment mechanisms of the peripheral device and electronic device of FIGS. 9 and 10 being coupled to one another according to some examples.

Referring now to FIG. 11, during operations when first attachment mechanism 400 on peripheral device 10 is brought within a proximity to second attachment mechanism 500 on electronic device 50, a magnetic attraction between the magnets 106, 108 of first attachment mechanism 400 and the magnets 308, 309, respectively, of second attachment mechanism 500 may cause the rotating members 404, 406 to rotate about axis of curvature 415 from the retracted position (FIG. 9) to a deployed position. In particular, when attachment mechanisms 400, 500 are brought within the proximity to one another, the magnets 106, 108 and rotating members 404, 406, respectively, rotate about axis of curvature 415 so that outer ends 404b, 406b are rotated outward and extended away from body 12 in opposite directions about axis of curvature 415. The length of slot 414 may define the maximum rotation of rotating members 404, 406 during operations.

As previously described, contact surfaces 501, 502 of second attachment mechanism 500 are nonmagnetic. Thus, when attachment mechanisms 400, 500 are brought within a proximity to one another, and the contact surfaces 401, 402 are rotated outward from body 12 about axis of curvature 415 as previously described, the contact surfaces 501, 502 (and rotating members 504, 506, respectively) remain in the retracted position (e.g., of FIG. 10) via the magnetic attraction between magnetic members 510, 512 and magnets 308, 309, respectively.

Referring still to FIG. 11, after rotating the contact surfaces 401, 402 to the deployed position, the contact surfaces 401, 402 on first attachment mechanism 400 on peripheral device 10 may be brought into contact with surfaces 501, 502 on second attachment mechanism 500. The magnetic attraction between first poles 106b, 308b of magnets 106, 308, respectively, and between second poles 108b, 309b of magnets 108, 309, respectively, may be greater than the magnetic attraction between magnetic members 510, 512 and magnets 308, 309, respectively. As a result, the engagement between contact surfaces 401, 402, and contact surfaces 501, 502 may cause the contact surfaces 501, 502 to rotate about axis of rotation 515 into the cavity 54 until the contact surfaces 401, 501 are compressed between magnets 106, 308, and the contact surfaces 402, 502 are compressed between magnets 108, 309.

As was previously described for attachment mechanisms 100, 110 (FIG. 8), when the attachment mechanisms 400, 500 are fully engaged as shown in FIG. 11, a portion of the engaged contact surfaces 401, 501 and the engaged contact surfaces 402, 502 are positioned within the cavity 54. Also, a plane of contact 403 for the engaged contact surfaces 401, 501 may extend at the angle α relative to the central axis 15, and a plane of contact 405 for the engaged contact surfaces 402, 502 may extend at the angle β relative to the central axis 15. The planes of contact 403, 405 may converge (or diverge) to (or from) one another as generally shown in FIG. 11. Thus, if a shear force is applied to peripheral device 10 and/or electronic device 50 along (or parallel to) central axis 15, the angled orientation of the engaged contact surfaces 401, 501 and 402, 502 as well as the recessed position of the contact surfaces 401, 501 and 402, 502 within cavity 54 may resist disconnection.

The magnetic attraction between second poles 106b, 308b of magnets 106, 308, respectively, and the magnetic attraction between second poles 108b, 309b of magnets 108, 309, respectively, may maintain the engagement between attachment mechanisms 400, 500 of peripheral device 10 and electronic device 50 shown in FIG. 11. However, if a user wishes to use the peripheral device 10 (e.g., to make inputs on electronic device 50), a sufficient force may be applied (e.g., by pulling) on the body 12 of peripheral device 10 in a direction that is perpendicular to axis 15 to overcome the magnetic attraction between magnets 106, 108, 308, 309 and thereby disconnect contact surfaces 401, 402, 501, 502. Upon disconnection of contact surface 401, 402, 501, 502, the rotating members 504, 506 may rotate about axis of rotation 515 back to the retracted position of FIG. 10 under the magnetic attraction between magnetic members 510, 512 and magnets 308, 309, respectively. In addition, once the first attachment mechanism 400 of peripheral device 10 has been moved to a sufficient distance from second attachment mechanism 500 of electronic device 50, the rotating members 404, 406 may rotate about axis of curvature 415 back to the retracted position of FIG. 9, via the magnetic attraction between first poles 106a, 108a of magnets 106, 108 and magnetic members 410, 412, respectively.

The examples disclosed herein include attachment mechanisms (e.g., attachment mechanisms 100, 110, 400, 500) for attaching a peripheral device (e.g., peripheral device 10) to a corresponding electronic device (e.g., electronic device 50) that may resist shear forces. Therefore, through use of the example attachment mechanisms disclosed herein, a peripheral device may be more securely held to an electronic device such that instance of a misplaced peripheral device may be reduced.

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the preceding discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially"

generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As used herein, including in the claims, the word "or" is used in an inclusive manner. For example, "A or B" means any of the following: "A" alone, "B" alone, or both "A" and "B." In addition, when used herein including the claims, the word "generally" or "substantially" means within a range of plus or minus 10% of the stated value.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
    a peripheral device comprising a first contact surface and a hinge coupled to the first contact surface; and
    an electronic device comprising:
        a housing;
        a second contact surface aligned with a surface of the housing; and
        a hinge coupled to the second contact surface;
    wherein in response to an engagement between the first contact surface of the peripheral device and the second contact surface of the electronic device, the first contact surface is to pivot about the hinge coupled to the first contact surface and the second contact surface is to pivot about the hinge coupled to the second contact surface such that a portion of the first contact surface and a portion of the second contact surface are recessed within the housing.

2. The system of claim 1, wherein the peripheral device comprises a first magnet coupled to the first contact surface, wherein the electronic device comprises a second magnet positioned within the housing, and wherein when the first contact surface is engaged with the second contact surface, a magnetic attraction between the first magnet and the second magnet is to pivot the second contact surface into the housing about the hinge coupled to the second contact surface.

3. The system of claim 2, wherein the peripheral device comprises a body, and wherein the magnetic attraction between the first magnet and the second magnet is to pivot the first contact surface outward from the body.

4. The system of claim 2, wherein the second magnet is fixed within the housing such that the second contact surface is to pivot about the hinge coupled to the second contact surface relative to the second magnet.

5. The system of claim 2, wherein the second contact surface is nonmagnetic.

6. A system, comprising:
    a peripheral device comprising:
        a body;
        a pair of first planar contact surfaces pivotably coupled to the body about an axis of rotation; and
        a pair of first magnets coupled to the body; and
    an electronic device comprising:
        a housing; and
        an attachment mechanism coupled to the housing;
    wherein a magnetic attraction between the pair of first magnets and the attachment mechanism of the electronic device is to pivot the pair of first planar contact surfaces outward from the body in opposite directions about the axis of rotation.

7. The system of claim 6, wherein the attachment mechanism comprises:
    a pair of second contact surfaces, wherein the pair of second contact surfaces are nonmagnetic; and
    a pair of second magnets positioned within the housing, wherein the magnetic attraction is between the pair of first magnets and the pair of second magnets.

8. The system of claim 7, wherein the pair of second contact surfaces are biased away from the pair of second magnets.

9. The system of claim 8, wherein the pair of second contact surfaces each include a magnetic member coupled thereto that is magnetically attracted to a corresponding one of the pair of second magnets to bias the pair of second contact surfaces away from the pair of second magnets.

10. The system of claim 6, wherein when the first pair of planar contact surfaces are engaged with the attachment mechanism, a portion of each first planar contact surface is inserted within the housing of the electronic device.

11. A system, comprising:
    a peripheral device, comprising:
        a body;
        a pair of first contact surfaces pivotably coupled to the body about a first axis of rotation, wherein each first contact surface has an inner end that is proximate the first axis of rotation and an outer end that is distal from the first axis of rotation; and
    an electronic device, comprising:
        a housing; and
        a pair of second contact surfaces pivotably coupled the housing about a second axis of rotation, wherein each second contact surface has an inner end that is proximate the second axis of rotation and an outer end that is distal from the second axis of rotation;
    wherein when the pair of first contact surfaces is engaged with the pair of second contact surfaces:
        the pair of first contact surfaces are rotated about the first axis of rotation such that the outer end of each of the first contact surfaces is extended away from the body; and
        the pair of second contact surfaces are rotate about the second axis of rotation such that the outer end of each of the second contact surfaces is recessed into the housing.

12. The system of claim 11, wherein the peripheral device comprises a pair of first magnets coupled to the pair of first contact surfaces, wherein the electronic device comprises a pair of second magnets positioned within the housing, and wherein a magnetic attraction between the pair of first magnets and the pair of second magnets is to rotate the pair of first contact surfaces about the first axis of rotation.

13. The system of claim 12, wherein the pair of second contact surfaces are rotationally biased about the second axis of rotation to align with an outer surface of the housing.

14. The system of claim 13, wherein the pair of first contact surfaces are rotationally biased about the first axis of rotation to extend parallel to a longitudinal axis of the body.

15. The system of claim 11, wherein the pair of first contact surfaces are to engage with the pair of second contact surfaces along converging planes.

16. The system of claim 1, wherein, when the first contact surface and second contact surface engage with one another, a plane of engagement between the first contact surface and second contact surface is oriented at an angle with respect to a central axis of peripheral device.

17. The system of claim 1, wherein in response to the engagement between the first contact surface of the peripheral device and the second contact surface of the electronic device, the first contact surface is to pivot about the hinge coupled to the first contact surface away from a body of the peripheral device.

18. The system of claim 6, wherein when the pair of first planar contact surfaces are engaged with the attachment mechanism, the attachment mechanism is to rotate within the housing.

19. The system of claim 6, wherein the attachment mechanism is positioned within a cavity of the housing.

20. The system of claim 6, wherein the a peripheral device comprises a pair of second magnets coupled to the body, wherein, absent the magnetic attraction between the pair of first magnets and the attachment mechanism of the electronic device, another magnetic attraction between the pair of first magnets and the pair of second magnets maintains the pair of first planar contact surfaces flush with a planar surface of the body.

\* \* \* \* \*